United States Patent
Wang et al.

(10) Patent No.: US 12,552,947 B2
(45) Date of Patent: Feb. 17, 2026

(54) BIOINK FOR 3D PRINTING, THE PREPARATION METHOD AND USAGE

(71) Applicants: Shanghai Jiao Tong University, Shanghai (CN); Jiaxing Yaojiao Medical Device Co. Ltd., Jiaxing (CN)

(72) Inventors: Jinye Wang, Shanghai (CN); Huajie Wang, Shanghai (CN)

(73) Assignees: SHANGHAI JIAO TONG UNIVERSITY, Shanghai (CN); JIAXING YAOJIAO MEDICAL DEVICE CO. LTD., Jiaxing (CN)

(*) Notice: Subject to any disclaimer, the term of this patent is extended or adjusted under 35 U.S.C. 154(b) by 1231 days.

(21) Appl. No.: 17/421,115

(22) PCT Filed: Jan. 8, 2019

(86) PCT No.: PCT/CN2019/070746
§ 371 (c)(1),
(2) Date: Feb. 9, 2022

(87) PCT Pub. No.: WO2020/142888
PCT Pub. Date: Jul. 16, 2020

(65) Prior Publication Data
US 2022/0154018 A1    May 19, 2022

(51) Int. Cl.
*C09D 11/00* (2014.01)
*A61F 13/01* (2024.01)
(Continued)

(52) U.S. Cl.
CPC ........ *C09D 11/04* (2013.01); *A61F 13/01012* (2024.01); *A61L 15/32* (2013.01);
(Continued)

(58) Field of Classification Search
CPC ......... C09D 11/04; B33Y 70/00; B33Y 80/00; A61F 13/01012; A61L 5/32; A61L 24/227; A61L 31/146
(Continued)

(56) References Cited

U.S. PATENT DOCUMENTS

2017/0218228 A1    8/2017    Jose et al.

FOREIGN PATENT DOCUMENTS

| CN | 101171313 | 4/2008 |
| CN | 103739852 A * | 4/2014 |

(Continued)

*Primary Examiner* — James E McDonough
(74) *Attorney, Agent, or Firm* — Rankin, Hill & Clark LLP

(57) ABSTRACT

The present invention relates to a bioink for 3D printing, the preparation method, and the usage. Such bioink is a gel made of α-zein, porogen by 0-10% of the weight of zein, ethanol and water. The preparation method consists of: 10-50% zein is dissolved into an aqueous solution containing 40-90% (v/v) of ethanol, then, the porogen by 0-10% of the weight of zein is added, and then, this solution is allowed to stand at 5-95° C. for 1-10 days, or stirred for 30 min-24 hours, and thus, the bioink for 3D printing can be obtained. The conditions applied to prepare such bioink are mild and the method adopted is easy to operate, in addition, the said bioink for 3D printing has good mechanical properties and biocompatibility, which can be applied in the field of biomedicine for preparing tissue engineered substitutes and hemostatic materials by 3D printing at room temperature.

17 Claims, 3 Drawing Sheets

(51) Int. Cl.
 A61L 15/32 (2006.01)
 A61L 27/22 (2006.01)
 A61L 31/14 (2006.01)
 B33Y 70/00 (2020.01)
 C09D 11/04 (2006.01)
 B33Y 80/00 (2015.01)

(52) U.S. Cl.
 CPC ............ A61L 27/227 (2013.01); A61L 31/146 (2013.01); B33Y 70/00 (2014.12); B33Y 80/00 (2014.12)

(58) Field of Classification Search
 USPC ................................. 106/31.01, 31.13, 31.82
 See application file for complete search history.

(56) References Cited

FOREIGN PATENT DOCUMENTS

| | | | | |
|---|---|---|---|---|
| CN | 103781769 A | * | 5/2014 | ........... C07D 249/12 |
| CN | 103781796 A | * | 5/2014 | ............. C07K 1/145 |
| CN | 107496994 | | 12/2017 | |
| CN | 108912700 | | 11/2018 | |
| JP | 2002179971 | | 6/2002 | |

* cited by examiner

BIOINK FOR 3D PRINTING, THE PREPARATION METHOD AND USAGE

FIELD OF THE INVENTION

The present invention relates to the field of biological manufacturing, which involves with a bioink for 3D printing, the preparation method and usage.

BACKGROUND OF THE INVENTION 3D printing technology, as an emerging manufacturing technology which have grabbed attention in recent year, is a 3D digital forming technology which obtains data by means of computer-aided design, or through imaging diagnostic equipment such as computerized tomography (CT) scanner, and then outputs the data to a 3D printer, as well as completes precise 3D stacking by utilizing bioink for printing, and thus quickly creates a desired shape. Up to now, the materials which are applicable for 3D printing consist of synthetic polymers (such as polylactic acid (PLA), polycaprolactone (PCL)), natural polymers (such as gelatin, collagen, chitosan, sodium alginate and cellulose) and inorganic materials (such as hydroxyapatite, tertiary calcium phosphate). Meanwhile, the natural polymer has such characteristics as excellent biocompatibility, degradability and printability at lower temperature. However, there are certain limitations on their application due to poor mechanical properties. Thus, it is urgent to find out a new bioink based on natural polymer materials for the field of 3D printing.

It has been proven that the zein has application potential in the field of tissue engineering. For instance, the three-dimensional porous scaffold prepared by traditional compression forming method has outstanding cytocompatibility and mechanical properties, which can be applied for repairing bone defects. Developing a bioink for 3D printing, which is made from zein, would greatly facilitate the wider application of this material in the field of biomedical engineering. Based upon retrieval, there is only one conference paper is related to (ESAFORM 2016: Proceedings of the 19th International EASFORM Conference on Material Forming), and the work described therein used a mixture of zein and glycerin, which was used as plasticizer, as a bioink for printing at the temperature of 130° C. Wherein, zein would demonstrate thermoplastic properties at such temperature, and thus impede its biocompatibility and degradation property. The bioink for 3D printing of the present invention, which is made from zein, can be applied for 3D printing under mild conditions, and thus, it not only would not affect the structure and properties of zein, but also be conducive to maintain the activity of cells and active factors.

SUMMARY OF THE INVENTION

The problem to be solved by the invention is to provide an ink material for 3D printing.

Another problem to be solved by the invention is to provide the preparation method of the ink material for 3D printing.

The third problem to be solved by the invention is to provide the use of the 3D printing ink.

The bioink for 3D printing of the present invention is a gel made of α-zein, which can be used for 3D printing at room temperature. Specifically, the gel is formed by a mixed solution of ethanol and water, which contains 10-50% (w/v) of α-zein, in addition, the ratio between the said mixed solution of ethanol and water and α-zein is the ratio of volume to weight, for example, there are 10-50 grams of α-zein in 100 mL of the mixed solution of ethanol and water. It is recommended that the α-zein gel shall contain the α-zein by 30-50% of weight. For the said mixed solution of ethanol and water, the volume ratio of ethanol to water is 40-90:10-60. In addition, the recommended volume ratio of ethanol to water is 60-85:15-40.

The said preparation method of the bioink for 3D printing of the present invention can be realized by following steps: 10-50% zein is dissolved into the mixed solution of ethanol and water, then, this solution is allowed to stand at 5-95° C. for 1-10 days, wherein the recommended temperature and reaction time is 10-50° C. and 1-3 days, respectively, or stirred for 30 min-24 hours, and thus, the bioink for 3D printing can be obtained. The volume ratio of ethanol to water in the said mixed solution is 40-90:10-60. In addition, for the said preparation method, the pore structure and porosity of the printed product can be adjusted by means of adding porogen in the prepared bioink, and the recommended amount to be added is 0-10% w/w of the mass of zein. Furthermore, the said porogen can be water-soluble salts, such as mannitol, ammonium bicarbonate, sodium chloride, sodium tartrate, sodium citrate, etc., sugar particles, paraffin particles or ice particles.

The bioink for 3D printing of the present invention can be used in the field of biomedicine, including: create desired shape precisely and quickly by 3D printer based upon the digital data obtained by imaging diagnostic equipment such as computerized tomography (CT) scanner, and then print tissue engineered substitutes and hemostatic materials with high resolution, internal pore structure and controllable mechanical properties, such as: tubular products (including nerve conduit, windpipe, urethra, and blood vessel, etc.), membraniform products (including artificial skin and hemostatic membrane materials), and the products in the form of 3D scaffold (including bone, cartilage, ear and hemostatic materials). Wherein, the porosity of the scaffold is between 30% and 95%; the compressive strength is between 0.2 MPa and 20 MPa, the compressive modulus is between 10 MPa and 300 MPa; in addition, the bending strength is between 0.5 MPa and 18 MPa, the bending modulus is between 15 and 100 MPa; the tensile strength is between 0 MPa and 2 MPa, and the tensile modulus is between 0 MPa and 20 MPa. Furthermore, the gelatinous bioink can be used to stop bleeding resulted from deep penetrating wound with irregular wound directly by means of injection or smearing without printing, or plays the effect of hemostasis in collaboration with products by 3D printing. Wherein, the zero-shear viscosity of the bioink is 30-5000 Pa·s, and recommended one is 120-4000 Pa·s. In addition, the hemostasis mechanism is divided into following steps: firstly, the release of the ethanol contained in the gel would make the gel solidify while precipitate the protein components in the blood; then, it would adsorb a great many of blood platelets; and finally, the fibrinogen would be concentrated into fibrin, which can capture red blood cells and other blood cells.

The products printed with the aforesaid bioink for 3D printing of the present invention can be a single-component product of α-zein printed by a 3D print nozzle, or multi-component products which are mixtures of α-zein and other bioink materials (including: synthetic and natural polymers such as polylactic acid, sodium alginate, sodium carboxymethyl cellulose, and gelatin, etc.,) and are printed by two or more 3D print nozzles.

The bioink for 3D printing of the present invention, which is made from zein, has abundant raw materials and is easy to prepare. Furthermore, it can be applied for 3D bioprinting at room temperature, and thus, it not only would not affect the structure and properties of zein, but also be conducive to maintain the activity of cells and active factors.

DESCRIPTION OF THE INVENTION

The text below will describe the present invention in detail in conjunction with the following embodiments, which can only be used to further illustrate the present invention rather than being understood as imposing restrictions on the scope of protection of the present invention. For those skilled in the art can make various variations or modifications to the present invention after reading the content of the present invention, and the equivalent forms of which also shall fall within the scope of the attached claims of the present application.

Embodiment 1

A bioink for 3D printing, which is made from the material according to following parts by mass: 10 g of α-zein.

The preparation method of the bioink for 3D printing in this embodiment consists of following steps:

, α-zein is dissolved into 100 mL of the ethanol-aqueous solution, in which the volume fraction of ethanol is 40%, and then, the milky white solution is obtained after ultrasonic treatment at room temperature for 10 min. After that, this solution is kept at 10° C. for 10 days for completing reaction, and thus, the bioink for 3D printing can be obtained, wherein, the zero-shear viscosity of the bioink is about 28 Pa·s.

Embodiment 2

A bioink for 3D printing, which is made from the material according to following parts by mass: 20 g of α-zein.

Figure 1:
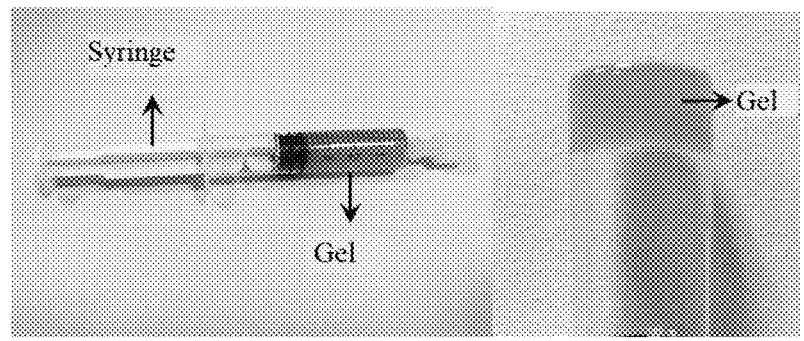
FIG. 1: The gelatinous bioink of α-zein for 3D printing prepared in Embodiment 2.

The preparation method of the bioink for 3D printing in this embodiment consists of following steps:

α-zein is dissolved into 100 mL of the ethanol-aqueous solution, in which the volume fraction of ethanol is 65%, and then, the transparent solution is obtained after ultrasonic treatment at room temperature for 10 min. After that, this solution is kept at 20° C. for one days for completing reaction, and thus, the bioink for 3D printing can be obtained, and it is gelatinous as shown in FIG. 1. Wherein, the zero-shear viscosity of the bioink is about 120 Pa·s.

Embodiment 3

A bioink for 3D printing, which is made from the material according to following parts by mass: 30 g of α-zein.

The preparation method of the bioink for 3D printing in this embodiment consists of following steps:

α-zein is dissolved into 100 mL of the ethanol-aqueous solution, in which the volume fraction of ethanol is 70%, and then, the transparent solution is obtained after ultrasonic treatment at room temperature for 10 min. After that, this solution is kept at 30° C. for two days for completing reaction, and thus, the bioink for 3D printing can be obtained, wherein, the zero-shear viscosity of the bioink is about 389 Pa·s.

Figure 2:
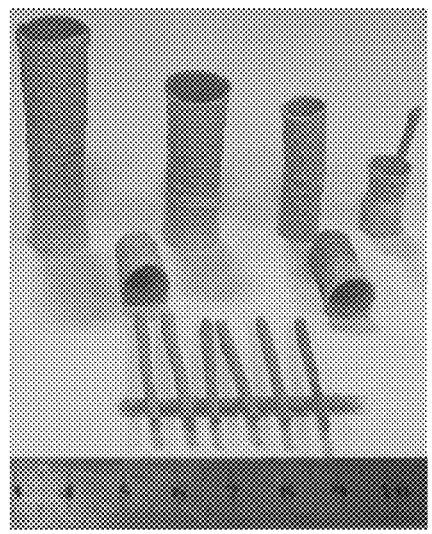
FIG. 2: The tubular tissue engineered product produced by 3D printing with the bioink of α-zein prepared in Embodiment 3.

The bioink prepared in this Embodiment is mixed with mannitol particles, which is used as porogen (accounts for 6% of the mass of zein, w/w), and then, loaded into the print nozzle. After that, the tubular products are printed through the print needle with a diameter of 0.5 mm, and under the conditions that the temperature is at 10° C., the printing speed is 8 mm/s and the printing pressure is 150 kPa. Then, the porous tubular product would be obtained after removing porogen by means of the water-boiling method. As shown in FIG. 2, the product can be used as a tissue engineered nerve conduit or for other purposes.

Embodiment 4

A bioink for 3D printing, which is made from the material according to following parts by mass: 40 g of α-zein.

Figure 3:
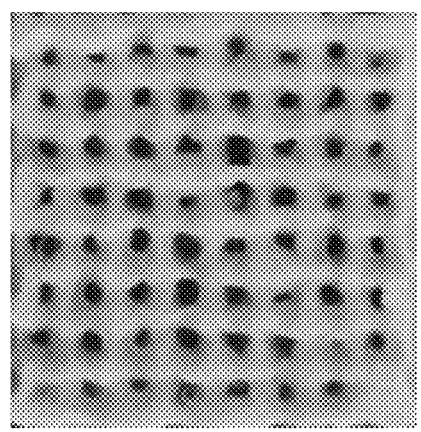
FIG. 3: The mesh-type hemostatic membrane material produced by 3D printing with the bioink of α-zein prepared in Embodiment 4, wherein, the part in black color indicates the pore structure of the mesh.
Figure 4:
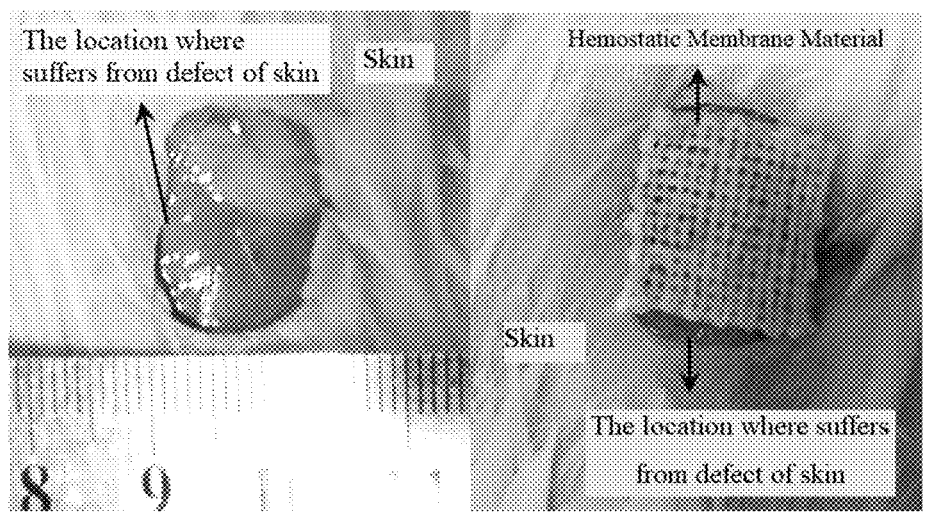
FIG. 4: The diagram of hemostatic effect of the said hemostatic membrane material of Embodiment 4 on dermatorrhagia.

The preparation method of the bioink for 3D printing in this embodiment consists of following steps:

The α-zein is dissolved into 100 mL of the ethanol-aqueous solution, in which the volume fraction of ethanol is 80%, and then, the transparent solution is obtained after ultrasonic treatment at room temperature for 10 min. After that, this solution is kept at 40° C. for 4 days for completing reaction, and thus, the bioink for 3D printing can be obtained, wherein, the zero-shear viscosity of the bioink is about 1832 Pa·s. The mesh-type membrane product can be printed at the following conditions: the diameter of printing needle is 0.33 mm, the temperature is at 20° C., the printing speed is 8 mm/s and the printing pressure is 80 kPa. As shown in FIG. 3, the product can be used as a hemostatic membrane material. In addition, FIG. 4 is the diagram of hemostatic effect of the hemostatic membrane material on dermatorrhagia occurred on the body of rat.

Embodiment 5

A bioink for 3D printing, which is made from the material according to following parts by mass: 50 g of α-zein.

The preparation method of the bioink for 3D printing in this embodiment consists of following steps:

α-zein is dissolved into 100 mL of the ethanol-aqueous solution, in which the volume fraction of ethanol is 85%, and then, the transparent solution is obtained after ultrasonic treatment at room temperature for 10 min. After that, this solution is kept at 50° C. for 8 days for completing reaction, and thus, the bioink for 3D printing can be obtained, wherein, the zero-shear viscosity of the bioink is about 1623 Pa·s.

Embodiment 6

A bioink for 3D printing, which is made from the material according to following parts by mass: 20 g of α-zein.

The preparation method of the bioink for 3D printing in this embodiment consists of following steps:

α-zein is dissolved into 100 mL of the ethanol-aqueous solution, in which the volume fraction of ethanol is 90%, and then, the transparent solution is obtained after ultrasonic treatment at room temperature for 10 min. After that, this solution is stirred at 10° C. for 12 hours for completing reaction, and thus, the bioink for 3D printing can be obtained, wherein, the zero-shear viscosity of the bioink is about 55 Pa·s.

Embodiment 7

A bioink for 3D printing, which is made from the material according to following parts by mass: 30 g of α-zein.

Figure 5:
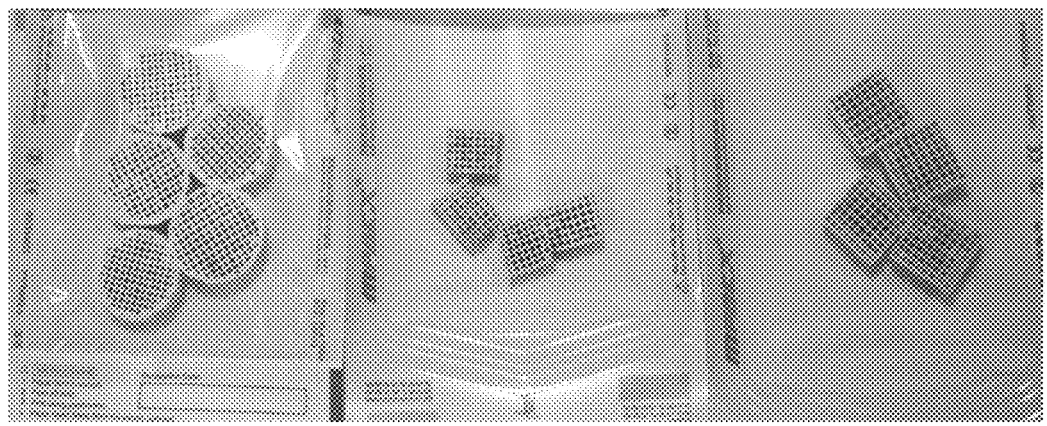
FIG. 5: The 3D products in different shapes produced by 3D printing with the bioink of α-zein prepared in Embodiment 7.

The preparation method of the bioink for 3D printing in this embodiment consists of following steps:

α-zein is dissolved into 100 mL of the ethanol-aqueous solution, in which the volume fraction of ethanol is 65%, and then, the transparent solution is obtained after ultrasonic treatment at room temperature for 10 min. After that, this solution is stirred at 20° C. for 30 min for completing reaction, and thus, the bioink for 3D printing can be obtained, wherein, the zero-shear viscosity of the bioink is about 344 Pa·s. The tissue engineered substitutes can be printed at the following conditions: the diameter of printing needle is 0.5 mm, the temperature is at 50° C., the printing speed is 8 mm/s and the printing pressure is 200 kPa. FIG. 5 shows the 3D hemostatic materials with various sizes printed by the bioink of this embodiment. It can be seen that the bioink made from zein is suitable for printing 3D scaffold products. Wherein, the compressive strength of scaffold is 3.34±1.25 MPa, the compressive modulus is 63.93±19.22 MPa; in addition, the bending strength is 5.30±1.32 MPa, the bending modulus is 52.07±11.07 MPa; the tensile strength is 0.11±0.02 MPa, and the tensile modulus is 2.63±1.25 MPa.

Embodiment 8

A bioink for 3D printing, which is made from the material according to following parts by mass: 30 g of α-zein.

The preparation method of the bioink for 3D printing in this embodiment consists of following steps:

α-zein is dissolved into 100 mL of the ethanol-aqueous solution, in which the volume fraction of ethanol is 85%, and then, the transparent solution is obtained after ultrasonic treatment at room temperature for 10 min. After that, this solution is stirred at 30° C. for 6 hours for completing reaction, and thus, the bioink for 3D printing can be obtained, wherein, the zero-shear viscosity of the bioink is about 551 Pa·s.

Figure 6:
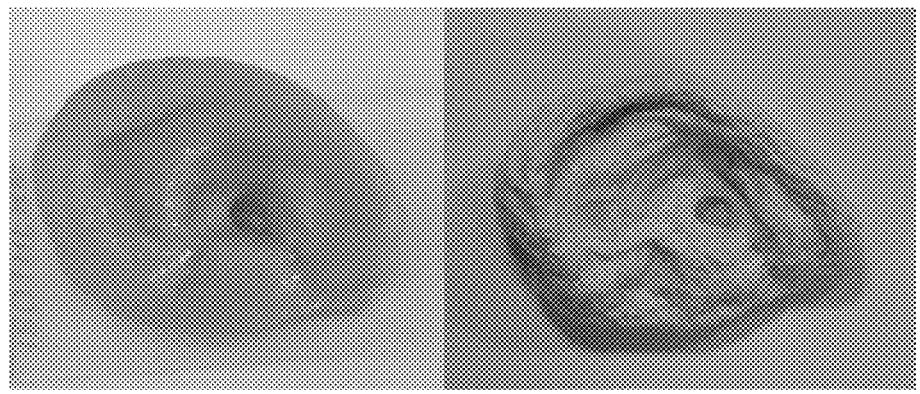
FIG. 6: The tissue engineered artificial ear containing cells produced by 3D printing with the bioink of α-zein prepared in Embodiment 8. Wherein, the artificial ear is in gel state when it is just printed out (left picture), and the picture on the right shows the artificial ear after solidifying.

Then, the aforesaid bioink for 3D printing is loaded in the first print nozzle, and the alginate sodium mixed with cells (cell density is $1*10^6$/mL) is loaded in the second print nozzle. After that, the tissue engineered organs can be printed at the following conditions: the diameter of printing needle is 0.33 mm, the temperature is at 37° C., the printing speed is 8 mm/s and the printing pressure is 80 kPa. FIG. 6 shows the printed artificial ear. Furthermore, such bioink be used alone or mixed with cells or other bioink to print out tissue engineered substitutes in irregular shapes by means of 3D printing.

Embodiment 9

A bioink for 3D printing, which is made from the material according to following parts by mass: 50 g of α-zein.

Figure 7:
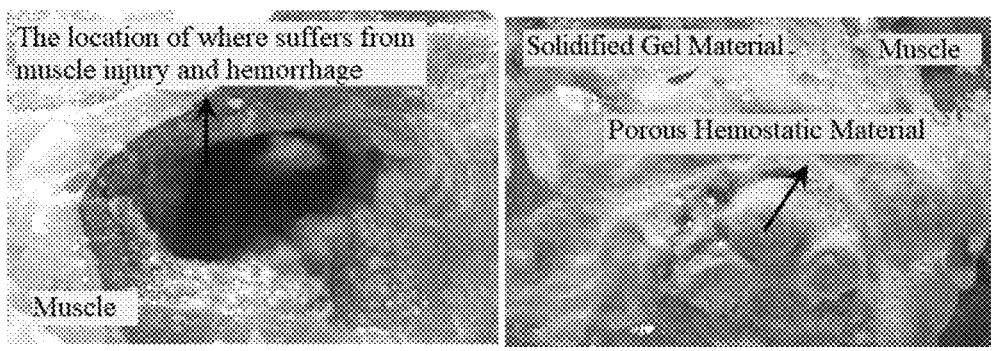
FIG. 7: The diagram of hemostatic effect of the said porous hemostatic material in Embodiment 7 on the model of penetrating injury in collaboration with the gel material of α-zein prepared in Embodiment 9.

The preparation method of the bioink for 3D printing in this embodiment consists of following steps:

α-zein is dissolved into 100 mL of the ethanol-aqueous solution, in which the volume fraction of ethanol is 90%, and then, the transparent solution is obtained after ultrasonic treatment at room temperature for 10 min. After that, this solution is stirred at 50° C. for 4 hours for completing reaction, and thus, the gel bioink can be obtained, wherein, the zero-shear viscosity of the bioink is about 3476 Pa·s. Furthermore, the product can be used to stop bleeding resulted from deep penetrating wound with irregular wound directly by means of injection or smearing, or to stop bleeding in collaboration with the 3D printing products (FIG. 7).

The invention claimed is:

1. A bioink for 3D printing, wherein the bioink is a shear-thinning gel consisting of α-zein, ethanol, water, and porogen.

2. The bioink for 3D printing according to claim 1, wherein
the gel contains α-zein in an amount of 10-50% by weight, and porogen in an amount of 0-10% of the weight of zein, and a remainder of the gel is made of the ethanol and the water;
a volume ratio of ethanol to water is 40-90:10-60; and
the porogen is a water-soluble salt selected from the group consisting of: mannitol, ammonium bicarbonate, sodium chloride, sodium tartrate, sodium citrate, etc., sugar particles, paraffin particles and ice particles.

3. The bioink for 3D printing according to claim 2, wherein the gel includes the α-zein in an amount of 30-50% by weight.

4. The bioink for 3D printing according to claim 2, wherein the volume ratio of ethanol to water is 60-85:15-40.

5. The bioink for 3D printing according to claim 1, wherein the bioink can be printed at room temperature.

6. The bioink for 3D printing according to claim 1, wherein a zero-shear viscosity of the bioink is 30-5000 Pa·s.

7. A preparation method of the bioink for 3D printing according to claim 1, the method comprising:
dissolving 10-50% α-zein into a mixed solution of ethanol and water;
allowing the mixed solution of ethanol and water with the 10-50% α-zein dissolved therein to stand at 5-95° C. for 1-10 days, or stirring the mixed solution of ethanol and water with the zein 10-50% α-zein dissolved therein for 30 min-24 hours to form the gel; and
adding porogen in an amount of 0-10% of the weight of α-zein to the gel,
wherein, a volume ratio of ethanol to water is 40-90:10-60.

8. The preparation method of the bioink for 3D printing according to claim 7, wherein the mixed solution of ethanol and water with the 10-50% α-zein dissolved therein is allowed to stand at 10° C.-50° C. for 1 to 3 days.

9. The bioink for 3D printing according to claim 1, wherein the bioink is used to prepare biomedical materials.

10. The bioink for 3D printing according to claim 9, wherein the biomedical materials are tissue engineered substitutes or hemostatic materials with tubular, membraniform, or 3D scaffold structures.

11. The bioink for 3D printing according to claim 10, wherein the tissue engineered substitutes consist of nerve conduit, artificial windpipe, artificial urethra, artificial blood vessel, artificial skin, hemostatic membrane materials, artificial bone, artificial cartilage and artificial ear.

12. The bioink for 3D printing according to claim 9, wherein the biomedical materials are materials used to stop bleeding resulting from a deep penetrating wound with irregular wound directly by means of injection or smearing, or to stop bleeding.

13. The preparation method of the bioink for 3D printing according to claim 7, wherein
    dissolving the 0-50% zein into the mixed solution of ethanol and water includes dissolving α-zein in an amount of 10-50% by weight, and porogen in an amount of 0-10% of the weight of zein, with a remainder made of the ethanol and the water measured; and
    the porogen is a water-soluble salt selected from the group consisting of: mannitol, ammonium bicarbonate, sodium chloride, sodium tartrate, sodium citrate, etc., sugar particles, paraffin particles and ice particles.

14. The bioink for 3D printing according to claim 1, wherein the bioink is prepared by a method comprising:
    (a) dissolving 10-50% α-zein into a mixed solution of ethanol and water with a volume ratio of 40-90:10-60;
    (b) allowing the mixed solution to stand at 5-95° C. for 1-10 days, or stirring the mixed solution for 30 min-24 hours to form the gel; and
    (c) adding porogen in an amount of 0-10% of the weight of α-zein.

15. The bioink for 3D printing according to claim 14, wherein the mixed solution of ethanol and water with the 10-50% α-zein dissolved therein is allowed to stand at 10° C.-50° C. for 1 to 3 days.

16. The bioink for 3D printing according to claim 1, wherein the bioink is configured for use in preparing biomedical materials selected from: tissue engineered substitutes, hemostatic materials, nerve conduits, artificial blood vessels, and artificial skin.

17. A method of treating a wound, comprising applying the bioink of claim 1 to a deep penetrating wound with irregular shape by injection or smearing.

* * * * *